United States Patent [19]

Engelsher

[11] 3,847,370
[45] Nov. 12, 1974

[54] TUBE SERVICING DEVICE

[75] Inventor: Harvey J. Engelsher, Yonkers, N.Y.

[73] Assignee: Horizon Industries, Ltd., Bronx, N.Y.

[22] Filed: Feb. 16, 1972

[21] Appl. No.: 226,782

[52] U.S. Cl............ 251/6, 222/214, 251/10, 417/476
[51] Int. Cl............................................. F16k 7/06
[58] Field of Search........ 251/6, 9, 10; 128/214 R, 128/214 F, 346; 222/102, 407, 214; 417/476, 477; 24/244, 126 B, 136 A

[56] References Cited
UNITED STATES PATENTS

| 827,640 | 7/1906 | Jessup | 251/10 |
|---|---|---|---|
| 3,194,452 | 7/1965 | Sanderford | 222/102 X |
| 682,269 | 9/1901 | Poe | 251/10 X |
| 1,983,462 | 12/1934 | Johnson | 24/244 X |
| 3,648,701 | 3/1972 | Botts | 251/6 X |

Primary Examiner—Alan Cohan
Assistant Examiner—Richard Gerard
Attorney, Agent, or Firm—Seidman & Fisher

[57] ABSTRACT

A tube servicing device having a pair of rollers, each rotatably supported by a resiliently flexible leg of a strap frame in opposing relation whereby when the legs are pushed together the rollers pinch between them the flexible tube to be serviced, and as the frame is drawn along the tube, the rollers travel in rolling contact engagement therewith to expel by squeegee action material within the tube over the length traversed.

2 Claims, 14 Drawing Figures

PATENTED NOV 12 1974 3,847,370

TUBE SERVICING DEVICE

BACKGROUND AND SUMMARY OF THE INVENTION

The present invention relates in general to a tube servicing device of the type which can be used to clean, clear and unclog flexible tubing such as is used for surgical purposes.

More particularly, the invention is directed to a tube servicing device which can be drawn along the outside of the tube to expel by squeegee action material, such as mucous, blood and other fluids, within the tube over the length traversed.

In the prior art, there are known several varieties of pinch clamps which are useful in controlling the flow of fluids through resiliently flexible tubing. One type of pinch clamp is exemplified by U.S. Pat. No. 2,930,570 and appears to be useful for the flow control purposes stated therein.

However, such pinch clamp is not useable for squeegee cleaning service whereas the device of the subject invention, while constructed primarily as a squeegee cleaner, can also be used for flow control purposes.

According to a preferred embodiment of the invention, there is provided on a strap-like frame a pair of oppositely disposed resiliently flexible legs and an opening to accommodate the lengthwise extension between these legs of a flexible tube to be serviced. A pair of rollers, each connected to a corresponding leg for rotation relative thereto, are arranged so as to pinch the tube between them when the legs are pushed together. As the frame is drawn along the tube, the rollers travel in pinching, rolling contact engagement with the tube and expel by squeegee action any material within the tube over the length traversed. Guide means on the frame constrain the legs for movement together along a fixed path and with the rollers held substantially parallel to each other, which has been found to give better cleaning action and easier operation than if the rollers were to be skewed. These guide means can be arranged so as to exert sufficient frictional forces upon each other to retain the legs in a pushed together operating configuration, or as desired, positive locking type leg retainer means can be provided.

For a better understanding of the invention and its various advantages and uses, reference should be had to the following detailed description and accompanying drawing which exemplify certain preferred embodiments of the invention.

DESCRIPTION OF THE PREFERRED EMBODIMENTS OF THE INVENTION

In FIGS. 1-5 there is shown a tube servicing device 10 having a strap-like frame 11, such as formed from sheet stainless steel, bent to define a pair of oppositely disposed resiliently flexible legs 12 and 13 and provided with openings 14 and 15 which accommodate the lengthwise extension between legs 12 and 13 of a flexible tube T (shown in phantom in FIGS. 3 and 4) to be serviced.

Figure 1:
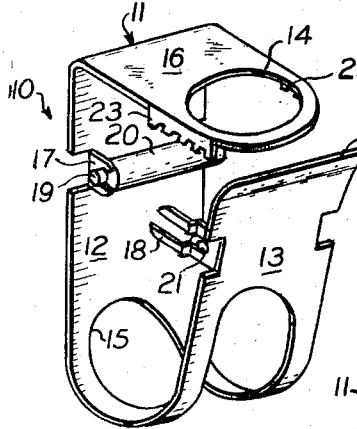
FIG. 1 is a perspective view of a tube servicing device according to a preferred embodiment of the invention, as seen in an opened state ready to receive a tube.
Figure 2:
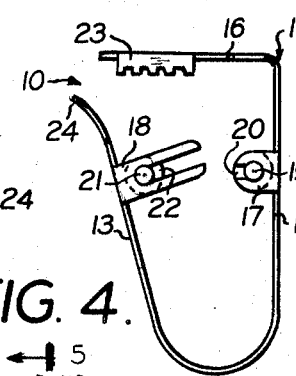
FIG. 2 is a side view of the tube servicing device shown in FIG. 1.
Figure 3:
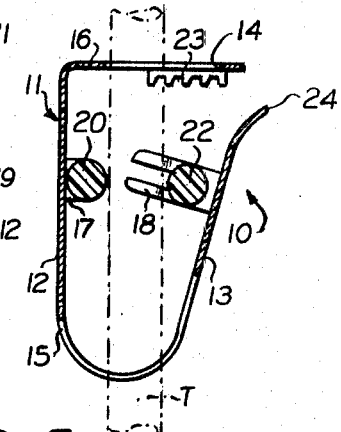
FIG. 3 is a sectional view of the tube servicing device shown in FIG. 1 as taken along line 3—3 therein, and showing how the tube is received for servicing.
Figure 4:
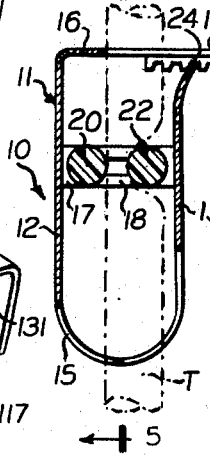
FIG. 4 is a sectional view of the tube servicing device similar to FIG. 3, but showing the device in a closed state.

The device 10 has an end piece 16 generally extending at right angles to leg 12, a pair of brackets 17 extending from leg 12 and a pair of brackets 18 extending from leg 13. Brackets 17 are slotted to receive and retain the axle 19 of roller 20, and brackets 18 are likewise slotted to receive and retain the axle 21 of roller 22. Rollers 20 and 22 are thus each connected to a corresponding leg 12, 13 of frame 11 for rotation relative thereto and are arranged such that when legs 12 and 13 are pinched together, as for example, is shown in FIGS. 3 and 4, the rollers 20 and 22 pinch the tube T between them. When frame 11 is then moved along tube T, the rollers 20, 22 travel therealong in pinching, rolling contact engagement with the outside of tube T so as to expel by squeegee action, material within tube T over the length thereof traversed.

On end piece 16 of frame 11 there are provided a pair of multi-toothed catch parts 23 that are disposed to receive the free end 24 of leg 13 and as shown in FIG. 4, these catch parts 23 are operable to grip leg 13 so as to afford capability for selectively retaining legs 12 and 13 in a pushed together configuration thereby maintaining rollers 20, 22 in pinching, rolling contact with tube T. By providing a multiplicity of teeth on catches 23, there is achieved a corresponding degree of variation in the amount of pinch exerted upon tube T so that as desired, the tube T can be partially closed by rollers 20, 22, or it can be fully closed by said rollers 20, 22 with different squeezing pressures as set by the position of leg end 24 in catches 23.

Figure 5:
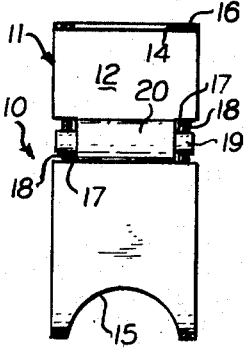
FIG. 5 is a sectional view of the tube servicing device of FIG. 4 as taken along line 5—5 therein.
Figure 6:
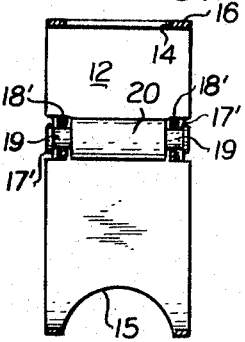
FIG. 6 is a sectional view of a tube servicing device similar to that of FIG. 5 but having a somewhat different roller guide arrangement.

It can be noted that the brackets 18 extend outward from leg 13 somewhat more than brackets 17 extend outward from leg 13. Brackets 17 and 18 actually serve as guide means on frame 11 and are operable to constrain legs 12 and 13 for movement together along a predetermined swing path in a fashion whereby rollers 20 and 22 are held substantially parallel to each other. In addition to supporting roller 22, the slots of brackets 18 are disposed to receive the axle 19 of roller 20 to constrain the movement of legs 12 and 13 against skewing when said legs 12, 13 are pushed together. As can be seen in FIG. 5, the brackets 18 fit in between brackets 17 and the ends of roller 20 when legs 12, 13 are pushed together. However, as can be seen from FIG. 6, the brackets 18' could alternatively be placed to fit outside brackets 17', the axle 19 extending sufficiently therebeyond to receive the slots of brackets 18' in such case. It should be further noted that the length of either or both axles 19, 21 and brackets 17', 18' can be made such that the slots of the pair of brackets 17', 18' associated with one roller 20, 22 engage the axle 19, 21 associated with the other roller 22, 20.

Figure 7:
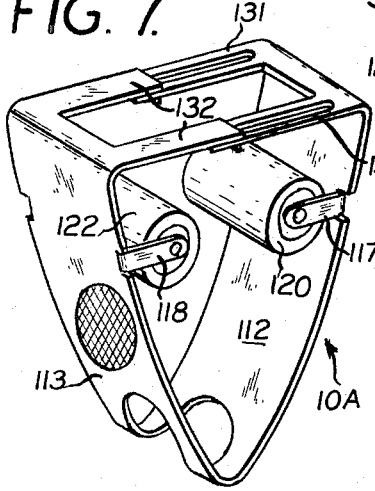
FIG. 7 is a perspective view of a tube servicing device according to another embodiment of the invention in which the rollers are held at a selected spacing by the friction of slidable guide parts.
Figure 8:
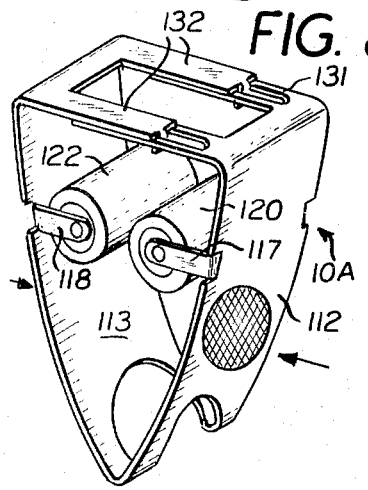
FIG. 8 is another perspective view of the tube servicing device shown in FIG. 7 as seen with the rollers positioned closer together.

FIGS. 7 and 8 exemplify a tube servicing device 10A which is somewhat similar to that shown in FIGS. 1–6, except that in the device 10A the rollers 120 and 122 are rotatably supported by respective pairs of brackets 117 and 118 that are in no way involved as part of the means for guiding the movement of the legs 112 and 113. Extending from leg 112 are a pair of slotted guide members 131 which are arranged to receive respective guide members 132 extending from leg 113. Corresponding guide members 131 and 132 are disposed in sliding contact engagement with each other and are arranged for generally parallel movement.

Figure 9:
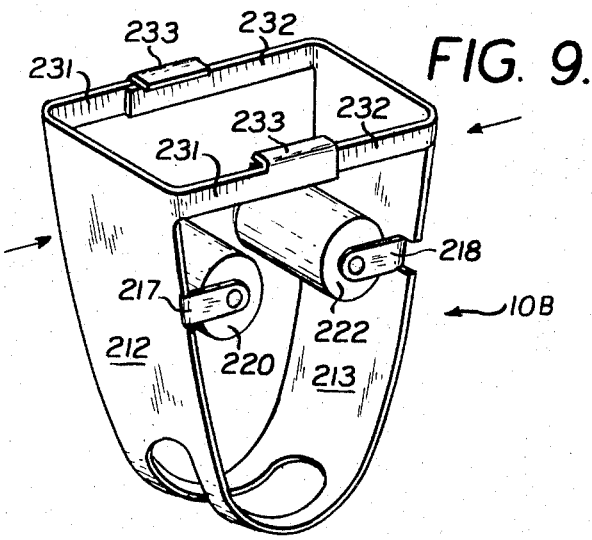
FIGS. 9, 10, 11 and 12 are each a perspective view of a tube servicing device according to respectively different embodiments of the invention.

Device 10B shown in FIG. 9 is basically similar to device 10A except that the guide members 231 extending from leg 212 have tabs 233 that overlap the guide members 232 extending from leg 213. Here again, the rollers 220 and 222 are rotatably supported by respective pairs of brackets 217 and 218 that are independent of the guide means for legs 212, 213.

Figure 10:
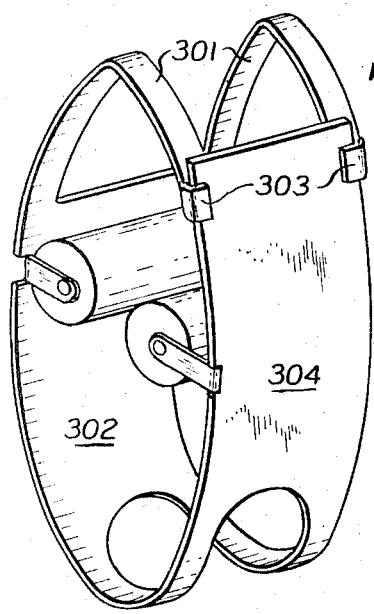

FIG. 10 illustrates a tube servicing device 10C which is somewhat similar to that shown in FIG. 9 except that only one pair of guide members 301 extending from leg 302 are provided. Guide members 301 are bent so that their tab pieces 303 can slidably engage along corresponding edge portions of leg 304.

Figure 11:
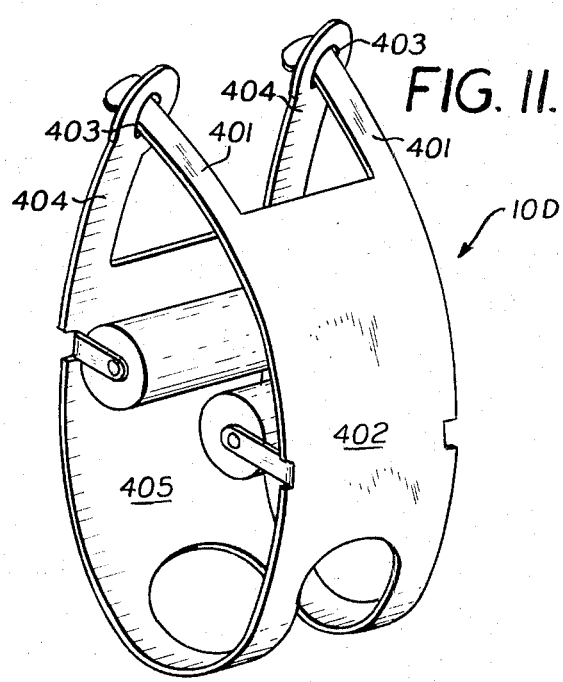

FIG. 11 shows a tube servicing device 10D that is somewhat similar to the device 10C except that device 10D has guide members 401 that extend from leg 402 and are disposed for insertion through apertures 403 of corresponding guide members 404 that extend from the opposite leg 405.

Figure 12:
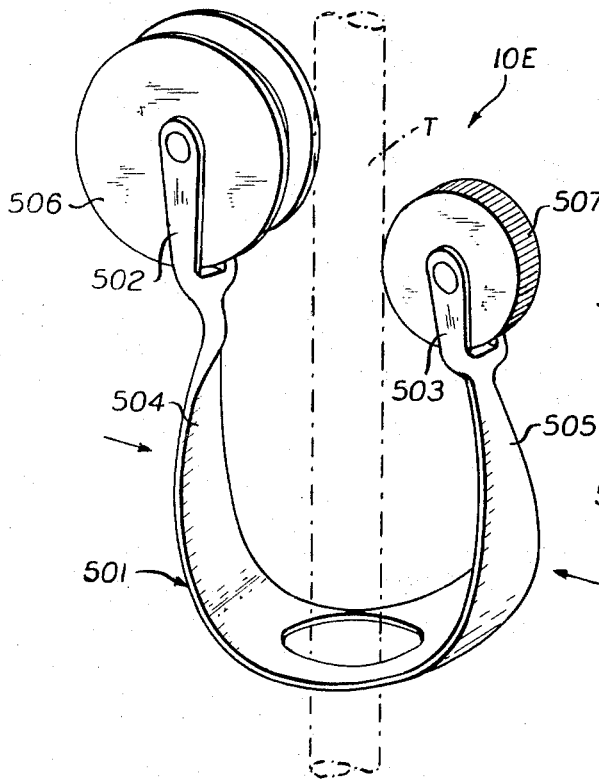
Figures 13, 14:
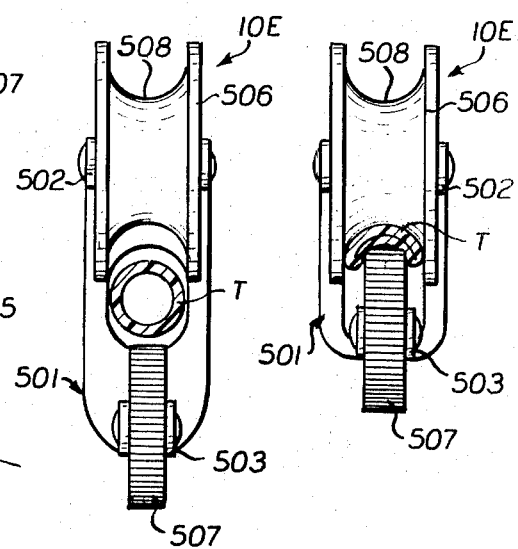
FIG. 13 is an end view of the tube servicing device of FIG. 12 showing how the tube is received.
FIG. 14 is an end view of the FIG. 12 device showing how the tube is squeezed by the rollers thereof.

Tube servicing device 10E shown in FIGS. 12–14 is somewhat different than the other devices 10, 10A–10D in that the frame 501 is more prominently U-shaped and has roller support brackets 502, 503 located at the free ends of legs 504 and 505 respectively, and the rollers 506 and 507 are more like disc wheels than those of previously described embodiments. As better seen in FIGS. 13 and 14 the one roller 506 has a concave surface 508 disposed to receive the tube T and constrain it against lateral movement when the legs 504 and 505 are pushed together such that the tube T is pinched between rollers 506 and 508 and thereby squeezed locally into the concave flattened configuration shown in FIG. 14. It should be noted that the legs 504 and 505 are unequal in length such that the concave roller 506 grips tube T slightly ahead of where it is gripped by roller 508. This provides for a somewhat better squeegee action with less compressive force applied to legs 504 and 505.

While positive leg locking means have been illustrated in connection with the device 10, it is to be appreciated by the artisan that the other embodiments wherein guide members are in sliding contact with each other or with parts of the device can be provided with similar self-holding capabilities simply by dimensioning such guide members in sliding contact to exert frictional forces upon each other sufficient to retain the legs in a pushed together configuration in which the rollers pinch the tube.

The tube servicing device of the invention can be expediently of a construction in which the frame, legs, guide means and roller support brackets are integrally formed from a common sheet of resilient material, such as stainless steel, plastic, or the like, which has been pre-cut.

What is claimed is:

1. A tube servicing device which comprises a frame having a pair of oppositely disposed resiliently flexible legs and a pair of apertures defining an opening to accommodate the lengthwise captive extension between and through said legs of a flexible tube to be serviced, a pair of rollers each connected to a corresponding leg of said frame for rotation relative thereto, said rollers being disposed to pinch the tube when said legs are pushed together and for movement with the frame in pinching rolling contact engagement with the tube to expel by squeegee action material within the tube over the length traversed, guide means on said frame operable to constrain said legs for movement together along a predetermined path and with said rollers held substantially parallel to each other, and catch means on said frame operable to engage the end of one of said legs to selectively retain said legs in a pushed together configuration, said guide means including brackets which support said rollers and have open-ended slots, the slots of the brackets supporting one roller being disposed to engage the opposing roller structure to constrain the movement of said legs when same are pushed together.

2. A tube servicing device according to claim 1 wherein said frame and guide means are integrally constructed from a common sheet of resilient material.

* * * * *